J. C. MILLNER.

Tobacco-Curing Furnace.

No. 9,108. Reissued Mar. 2, 1880.

Witnesses.

A. Ruppert,

James H. Lange.

Inventor.

Jackson C. Millner, per Edson Bros.

Attorneys.

N. PETERS, PHOTO-LITHOGRAPHER, WASHINGTON, D. C.

UNITED STATES PATENT OFFICE.

JACKSON C. MILLNER, OF DANVILLE, VIRGINIA.

TOBACCO-CURING FURNACE.

SPECIFICATION forming part of Reissued Letters Patent No. 9,108, dated March 2, 1880.

Original No. 148,737, dated March 17, 1874. Application for reissue filed January 7, 1879.

*To all whom it may concern:*

Be it known that I, JACKSON C. MILLNER, of Danville, in the county of Pittsylvania and State of Virginia, have invented certain new and useful Improvements in Tobacco-Curing Furnaces; and I do hereby declare that the following is a full, clear, and exact description of the invention, that will enable others skilled in the art to which it appertains to make and use the same, reference being had to the accompanying drawings, and to the letters of reference marked thereon, which form a part of this specification, and in which—

Figure 1:
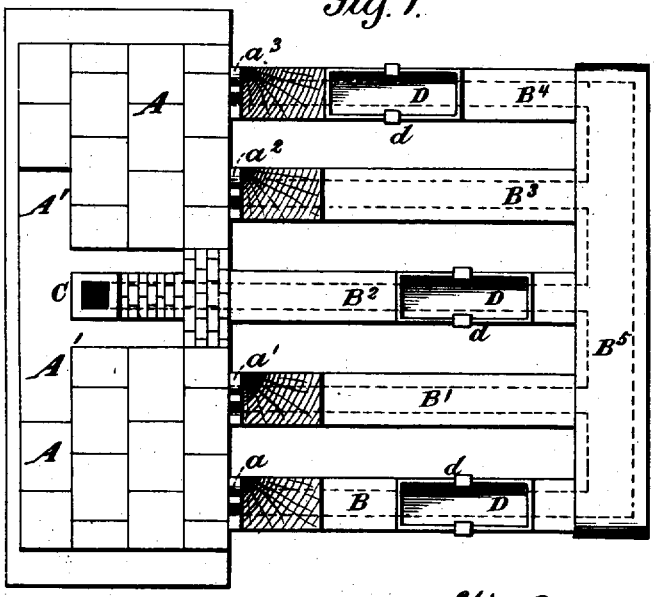
Figure 2:
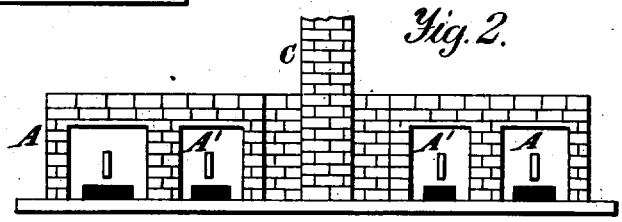
Figure 3:
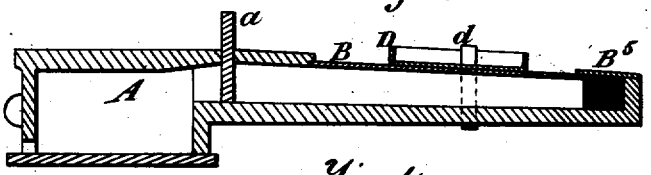
Figure 4:
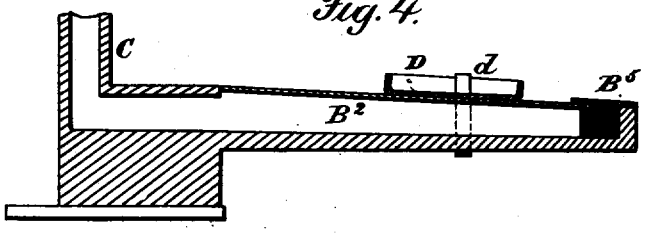

Figure 1 represents a top or plan view of my invention. Fig. 2 is a front view of the same; Fig. 3, a vertical section thereof, taken through one of the furnaces and one of the heaters; and Fig. 4, a corresponding view taken through one of the heaters and the chimney or outlet for smoke.

Like letters in the several figures are designated by similar letters of reference.

This invention appertains to certain improvements in curing tobacco, the object of which is to effect the more thorough and uniform curing of tobacco; and the novelty consists in the construction and arrangement of parts, as will be more specifically hereinafter set forth.

In the accompanying drawings, the letters A A′ indicate two sets of heating-furnaces, the said sets being of different capacities, the outer furnaces, forming one set, being larger than the intermediate furnaces, forming the other set, the said sets of furnaces being connected, respectively, with suitable heaters, B B′ $B^3$ $B^4$, communicating with a common flue, $B^5$, leading to a return-flue, $B^2$, which also serves as a heater. These furnaces are erected with a central space between the two inner ones, to provide for the extending forward to that end of the curer of the return central flue or heater and the chimney or smoke-exit, as presently set forth.

B B′ $B^2$ $B^3$ $B^4$ are a number of heaters, two of which upon each side of the curer communicate with the furnaces A A′, while the central or return heater conveys the smoke from the side heaters, with which it is connected by the back or cross flue or heater $B^5$, to the smoke-exit or chimney C, located at the end of the curer. The return or central heater, in addition to conducting smoke to the chimney, also receives a greater or less quantity of heat from the side heaters, thus serving in the twofold capacity of smoke-flue and heater.

By thus arranging the heaters so as to enable the locating of the smoke-exit or chimney at the furnace end of the curer, advantage is taken of unfavorable winds, in that they are prevented from driving the heat and smoke out of the furnaces at the doors, and the further advantage of preventing excessive draft is secured, to avoid the drawing or carrying of the products of combustion out of the chimney, as experienced where the chimney is located at the rear end of the curer.

The heaters B B′ $B^3$ $B^4$ are provided with cut-offs or valves $a$ $a'$ $a^2$ $a^3$, to regulate the heating of the same to effect the thorough and uniform curing of the tobacco.

In the first stage of curing the tobacco it is exposed to the greater heat of the heaters communicating with the larger furnaces, A, and then to the less heat of the heaters connecting with the smaller furnaces, A′, when it will be properly and thoroughly cured.

Pans D are adjusted upon the heaters by means of metallic straps $d$ or other suitable means. These pans, which are to be partially filled with water and to receive the tobacco-leaves to be cured, rest upon sheet-iron plates placed upon and forming the top surfaces of the heaters. The effect of the heat upon the pans is thus augmented.

I am aware that differently-arranged and tortuous flues have been before employed to increase heat-radiating surface in various devices used in drying fruit, lumber, and the like. In the art of curing tobacco I deem the return-flue, serving the double function described, as important.

Having thus described my invention, what I claim, and desire to secure by Letters Patent, is—

1. In a tobacco-curing apparatus, a gang of furnaces, each having heating-surfaces, and all connecting with a common flue, as shown, combined with a return-flue, which also serves as a heater and connects the said common flue with an escape-flue or chimney, as herein specified.

2. The combination, in a tobacco-curer, of two sets of furnaces of different capacities, leading through suitable heaters to a common flue connecting with a central heater, which serves as a return-flue, connected with a chimney located at the furnace end of the drier, as specified, for purposes set forth.

3. In a tobacco-curer, the combination of the furnace A A, direct heaters B B′ $B^3$ $B^4$, cross-flue $B^5$, return-heater $B^2$, and chimney C, located at the furnace end of the curer, and the valves or cut-offs $a$ $a'$ $a^2$ $a^3$, substantially as and for the purposes specified.

In testimony that I claim the foregoing I have hereunto set my hand this 28th day of December, 1878.

JACKSON C. MILLNER.

Witnesses:

JAMES WOOD,

WM. H. LINTHICUM.